United States Patent
Annis

(10) Patent No.: US 10,629,367 B2
(45) Date of Patent: Apr. 21, 2020

(54) PERMANENT MAGNET INDUCTION GENERATOR (PMIG)

(71) Applicant: Theodore C. Annis, Ann Arbor, MI (US)

(72) Inventor: Theodore C. Annis, Ann Arbor, MI (US)

( * ) Notice: Subject to any disclaimer, the term of this patent is extended or adjusted under 35 U.S.C. 154(b) by 84 days.

(21) Appl. No.: 15/833,435

(22) Filed: Dec. 6, 2017

(65) Prior Publication Data

US 2018/0158600 A1  Jun. 7, 2018

Related U.S. Application Data

(60) Provisional application No. 62/431,123, filed on Dec. 7, 2016.

(51) Int. Cl.
| | | |
|---|---|---|
| *H01F 13/00* | (2006.01) | |
| *H01F 29/14* | (2006.01) | |
| *H02N 11/00* | (2006.01) | |
| *H01F 38/08* | (2006.01) | |

(52) U.S. Cl.
CPC ............. *H01F 29/14* (2013.01); *H01F 38/08* (2013.01); *H02N 11/008* (2013.01); *Y10S 74/09* (2013.01)

(58) Field of Classification Search
CPC .......... H01F 29/14; H01F 38/08; H02K 21/12
USPC ....................................................... 335/284
See application file for complete search history.

(56) References Cited

U.S. PATENT DOCUMENTS

| | | | | |
|---|---|---|---|---|
| 4,006,401 A | * | 2/1977 | Villasenor de Rivas | H02K 35/06 323/362 |
| 5,731,649 A | * | 3/1998 | Caamano | H02K 1/02 310/179 |
| 5,982,070 A | * | 11/1999 | Caamano | H02K 1/02 29/596 |
| 2008/0246362 A1 | * | 10/2008 | Hirzel | H02K 21/12 310/156.02 |
| 2009/0096219 A1 | * | 4/2009 | Annis | H02K 53/00 290/1 R |
| 2013/0085069 A1 | * | 4/2013 | Bright | H01L 39/20 505/150 |

* cited by examiner

*Primary Examiner* — Shawki S Ismail
*Assistant Examiner* — Lisa N Homza
(74) *Attorney, Agent, or Firm* — John G. Posa; Belzer PC

(57) ABSTRACT

Conversion of magnetic flux energy into electrical power with a permanent magnet induction generator (PMIG) comprised of permanent magnets, a magnetic circuit, reluctance switches (magnetic flux switches), and a switching sequence performed by an electrical controller that causes the flux from two opposing, magnetically aligned permanent magnets to be repeatedly alternated through a single flux path for the purpose of generating AC electricity. Energy efficient reluctance switches operation permits the output electrical energy to exceed the energy required to operate them thereby enabling continuous operation that produces uninterrupted electricity without the need for fuel or external energy input.

17 Claims, 6 Drawing Sheets

PERMANENT MAGNET INDUCTION GENERATOR (PMIG)

REFERENCE TO RELATED APPLICATIONS

This application claims priority to U.S. Provisional Patent Application Ser. No. 62/431,123, filed Dec. 7, 2016, the entire content of which is incorporated herein by reference.

FIELD OF THE INVENTION

This invention relates generally to the conversion of energy into power and, in particular, to a device operative to convert magnetic flux energy into electrical power.

BACKGROUND OF THE INVENTION

The physics related to electromagnetic induction within an inductor and a transformer is described by Faraday's transformer equation:

$$\varepsilon = -\frac{dB}{dt}$$

According to Moskowitz, "Permanent Magnet Design and Application Handbook" 1995, p 52, magnetic flux may be thought of as flux lines which always leave and enter the surfaces of ferromagnetic materials at right angles, which never can make true right-angle turns, which travel in straight or curved paths, which follow the shortest distance, and which follow the path of lowest reluctance. Hopkinson's Law (the magnetic analogy to Ohm's Law) shows that magnetic flux in magnetic circuits is analogous to electrical current in electrical circuits and reluctance in magnetic circuits is analogous to resistance in electric circuits.

Magnetic paths for transformers are often constructed of laminated ferrous materials and inductors often employ ferrite materials, which are used for higher frequency operation for both devices. High performance magnetic materials are now available for use as magnetic members comprising all or part of a flux path within a magnetic circuit and are well suited to accommodate the (rapid) switching of magnetic flux with a minimum of eddy currents.

The patent literature describes a number of constructs that have been devised to vary the amounts of magnetic flux in alternate flux paths to induce electricity by disproportionately dividing the flux from a stationary permanent magnet or magnets between or among alternate flux paths repeatedly for the purpose of generating electricity. The increase of flux in one magnetic path and the corresponding decrease in the other path(s) provide the basis for inducing electricity when coils are wound around the paths. A variety of flux switching means have been employed to cause the flux to be increased/decreased through a particular alternate path with a corresponding decrease/increase in the other path and to do so repeatedly.

A "reluctance switch" is a device that can significantly increase or decrease the reluctance (resistance to magnetic flux) of a magnetic path in a direct and rapid manner and subsequently restore it to its original value in a direct and rapid manner. A reluctance switch typically has analogue characteristics. By way of contrast, an off/on electric switch typically has a digital characteristic as there is no electricity bleed-through. With the current state of the art, reluctance switches often have flux bleed-through. Reluctance switches may be implemented mechanically, such as to cause keeper movement to create an air gap, or electrically utilizing various techniques. One electrical approach, for example, uses control coils wound around a flux path. Another electrical arrangement involves the placement, within a flux path, of certain combinations of materials that change their reluctance upon the application of electricity.

A reluctance switch may also be implemented by using electromagnetic induction to magnetically saturate a section of the magnetic path to create a region of high reluctance (on-condition to an off-condition). A reluctance switch may also be implemented by using electromagnetic induction to magnetically un-saturate a section of the magnetic path that is already saturated by the use of a permanent magnet (off-condition to an on-condition). In both cases, the reluctance switch design must be sufficiently novel so as to not direct the electromagnetically induced flux used to operate the switch into the rest of magnetic circuit. A reluctance switch also may be implemented by temporarily disrupting a magnetic flux bridge (on-condition to an off-condition) such as that provided by a ferrofluid.

Villasenor de Rivas U.S. Pat. No. 4,006,401 discloses a method and apparatus for the production of electricity through the operation of a magnetic circuit that uses a single stationary permanent magnet, a single flux path around which is wound one or more conducting coils, and four reluctance switches that, when operated in the prescribed 2×2 alternating sequence, could alternately switch the flux from the permanent magnet through the single flux path so as to cause a reversal of the polarity (direction) in the path and thereby induce alternating electrical current in the coils. The method and apparatus provide a single flux path and operate its switching so as to cause a reversal of the polarity (direction) in the path.

Flynn U.S. Pat. No. 6,246,561; Patrick, et al. U.S. Pat. No. 6,362,718; and Pedersen U.S. Pat. No. 6,946,938 all disclose a method and apparatus for switching (dividing) the quantity of magnetic flux from a stationary permanent magnet or magnets between and among alternate paths for the purpose of generating electricity (and/or motive force). They provide for the increase of magnetic flux in one path with a corresponding decrease in the other path. There are always at least two paths.

Published U.S Patent Application No. 2009/0096219 discloses a method and apparatus for the production of electricity through the operation of a magnetic circuit that uses two single stationary permanent magnets, a single flux path around which is wound one or more conducting coils, and four reluctance switches that, when operated in the prescribed 2×2 alternating sequence, alternately switch the flux from the permanent magnet through the single flux path so as to cause a reversal of the polarity (direction) in the path and thereby induce alternating electrical current in the coils. The reluctance switches use magnetic saturation to change (increase) reluctance.

Veneruso US Patent 20100164303 A1 discloses the use of ferrofluids to reduce reluctance in an electrical generator.

SUMMARY OF THE INVENTION

This invention resides in an AC electricity generator operative to convert magnetic flux energy into electrical power. A primary goal is to provide a long-term supply of electricity that may be used directly or indirectly in both stationary and mobile applications. An advantage of the invention is that the reversal of the polarity (direction) of the magnetic flux through the single flux path of the center region provides a greater total change of magnetic flux (dB/dt) than the total of that produced in the alternate-path constructs by about three-fold. As such, another goal is to feed back some of the generated electricity to produce a self-sustaining cycle.

The preferred apparatus includes three magentizeable members, each having first and second ends, including a first member, a central member, and a second member. Four reluctance switches are provided, including a first switch between the first ends of the first and central members, a second switch between the second ends of the first and central members, a third switch between the first ends of the central and second members, and a fourth switch between the second ends of the central and second members.

The apparatus further includes a contiguous loop of magnetizable material. At least one permanent magnet has a first pole coupled to a first point of the loop and a second pole coupled to the first magentizeable member. Another permanent magnet has a first pole coupled to the second magentizeable member and a second pole coupled to an opposing point of the loop, whereby the first poles of both magnets are north, and the second poles of both magnets are south poles, or vice versa.

At least one loop of electrically conductive material such as wire is wound around the central magnetizeable member between the first and second ends thereof, and an electrical control unit operative to drive the reluctance switches at a switching frequency such that flux from the permanent magnets reverses in the central magentizeable member, thereby inducing electrical energy in the loop of electrically conductive material.

In the preferred embodiments, the magnetizable members and the loop of magnetizeable material exhibit a high magnetic permeability (low reluctance). The switching frequency may be between 1 Hz and 100,000 Hz, or more preferably between 50 Hz and 10,000 Hz.

The reluctance switches may be implemented by applying an electric current to cause electromagnetic induction to magnetically saturate a section of the magnetic path to create a region of high reluctance (on-condition to an off-condition), or to magnetically un-saturate a section of the magnetic path that is already saturated by the use of a permanent magnet (off-condition to an on-condition). Alternatively, the reluctance switches may be composed of a material that changes reluctance under the influence of an external stimulus such as an electric field, heat, or pressure. As a further alternative, the reluctance switches may be composed of a ferrofluidic material, in which case the switching circuitry may be operative to activate the switches applying heat to the ferrofluid via microwave energy or by heating a material surrounding the ferrofluid. As yet a different alternative, the reluctance switches composed of materials which change their crystal structure under the influence of an electric field or pressure such that the crystalline magnetic anisotropy constant changes and the permeability increases or decreases.

In any case, the reluctance switches change relative magnetic permeability from a value of between 1 and 10 to a value between 20 and one million, or vice versa, in response to the electrical control unit or, more preferably, between 1 and 3 to a value between 4 and one million, or vice versa, in response to the electrical control unit.

The permanent magnets, which may be implemented using a set of permanent magnets, may be ceramic ferrite magnets ($Fe_2O_3$), samarium cobalt ($SmCo_5$), or combinations of iron neodymium, and boron. The electrical control unit may be further operative to perform current trapping and/or operative to perform electrical energy capture and recycling.

DETAILED DESCRIPTION OF THE INVENTION

Figure 1:
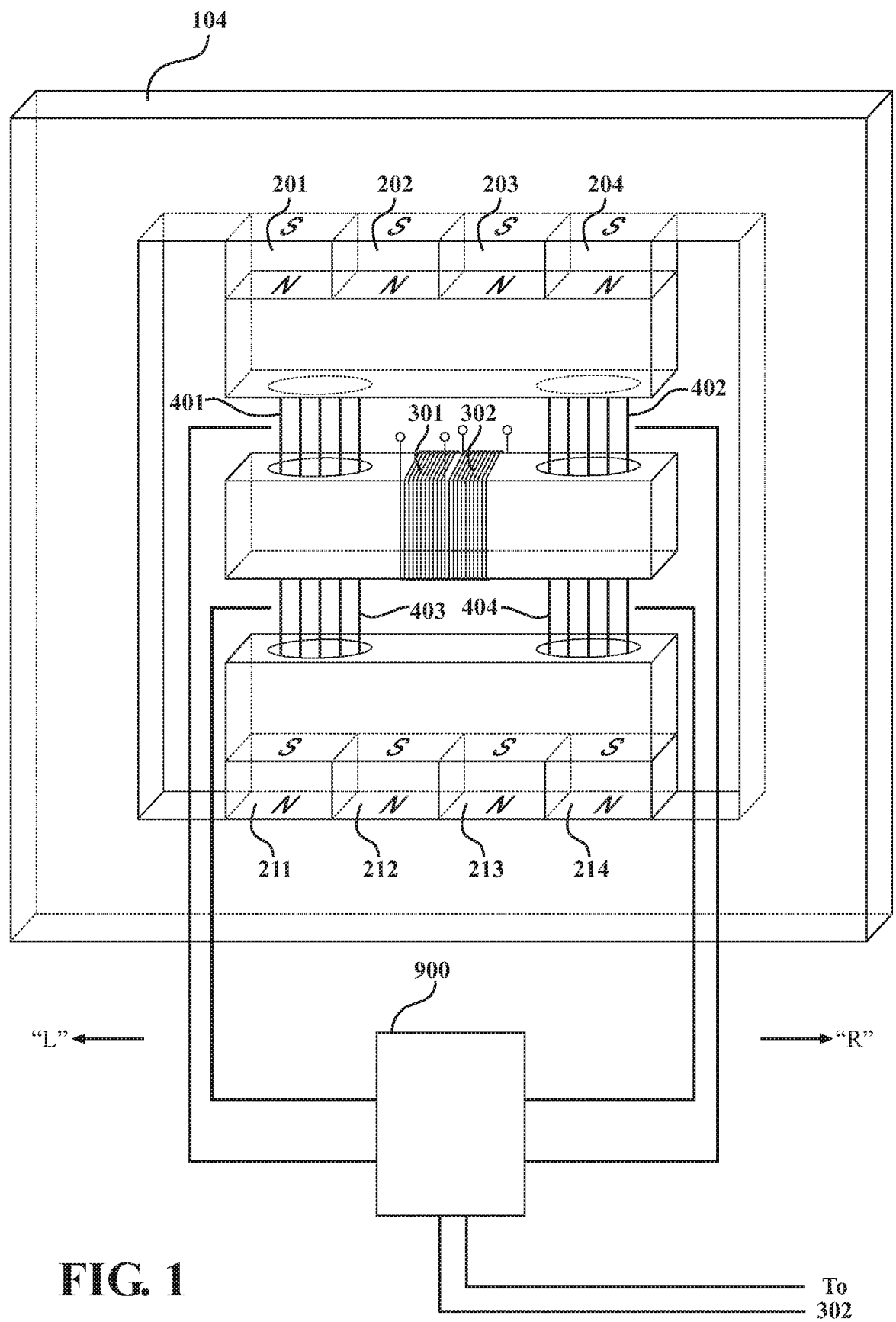
FIG. 1 depicts the AC Electricity Generator with its plurality of permanent magnets, magnetic continuity backbone, magnetic regions, single flux path center magnetizable member around which is wound a conducting pickup coil or coils, four reluctance switches, and an electrical control unit.

A preferred embodiment of the invention is illustrated in FIG. 1. "Right" and "left" orientations are shown in the figure with the understanding that these are arbitrary and for the purposes of description. The apparatus includes three magnetizable members, 106, 112, 118, defining a first region, a central region, and a second region, respectively. These magnetizable members have right and left ends. In particular, member 106 has left and right ends 108, 110; member 112 has left and right ends 114, 116; and member 118 has left and right ends 120, 122. Around the central region of member 112 there is wound an electrical conductor such as a coil or coils of wire, 301 and 302.

A contiguous backbone member of magnetizable material, loop 104, provides magnetic continuity for first and second sets of permanent magnets. A first magnet or set of permanent magnets, arranged in parallel at 201-204, that have their south pole(s) in contact with backbone member 104 and north pole(s) in contact with the first magnetizable member, 101. A second magnet or set of permanent magnets, 211-214, have a south pole in contact with the second magnetizable material and a north pole in contact with backbone member 104. For example, magnet 201 contacts region 124 of loop 104 and the left end 108 of member 110. As with the "right" and "left" designations, it will be appreciated that the polarities of the opposing magnets in regions 101 and 103 may be reversed so long as the flux they generate is additive (attractive).

The structure further includes four reluctance switches, including a first switch 401 coupling the left end of the first magnetizable member 101 to the left end of the magnetizable center member 102; a second switch 402 coupling the right end of the first magnetizable member 101 to the right end of the magnetizable center member 102; a third switch 403 coupling the left end of the second magnetizable member 103 to the left end of the magnetizable center member 102; and a fourth switch 404 coupling the right end of the second magnetizable member 103 to the right end of the magnetizable center member 102.

Figure 3:
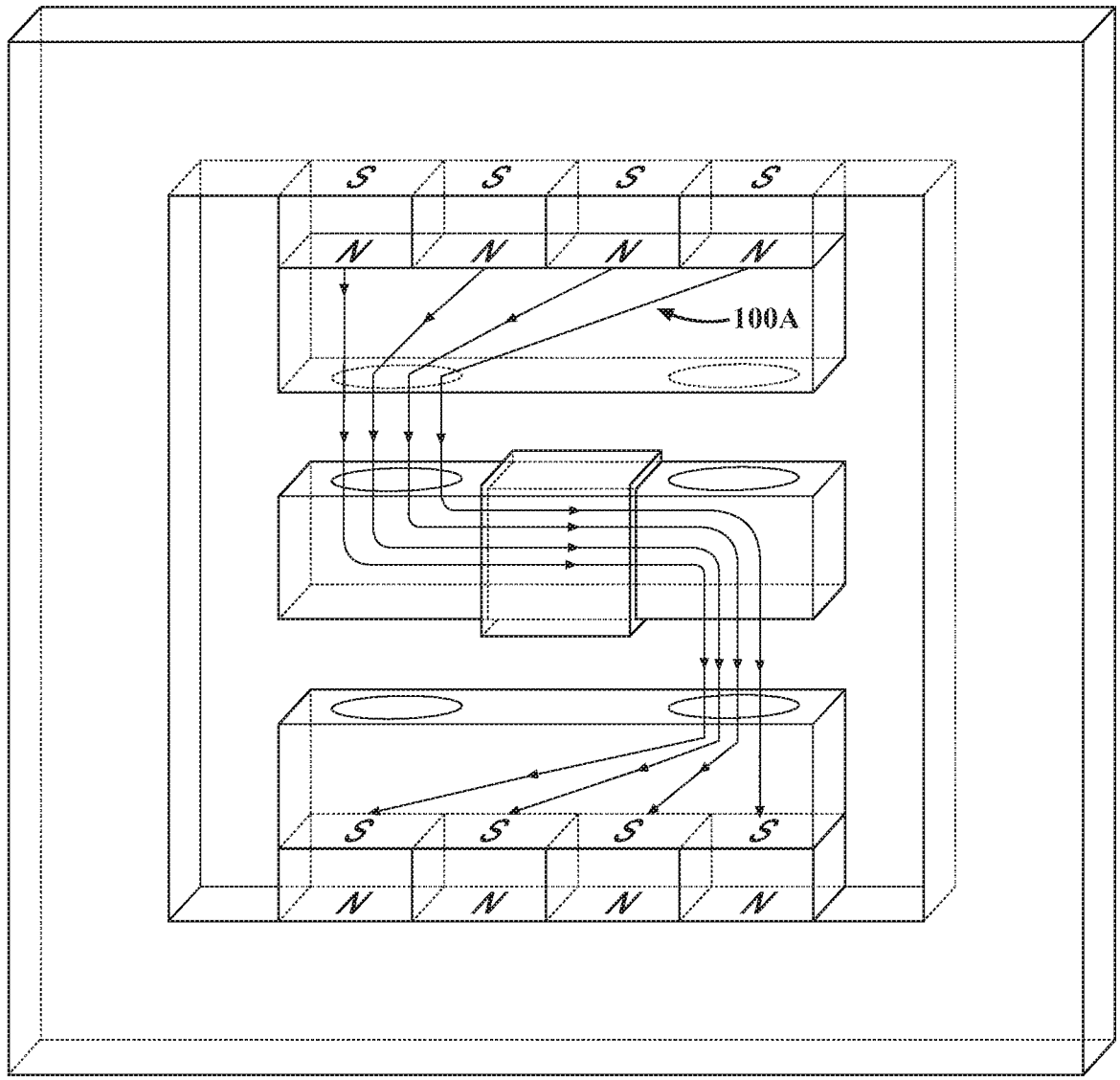
FIG. 3 shows the device of FIG. 1 with the reluctance switches sequenced to cause flux to flow in one direction through the center member.
Figure 4:
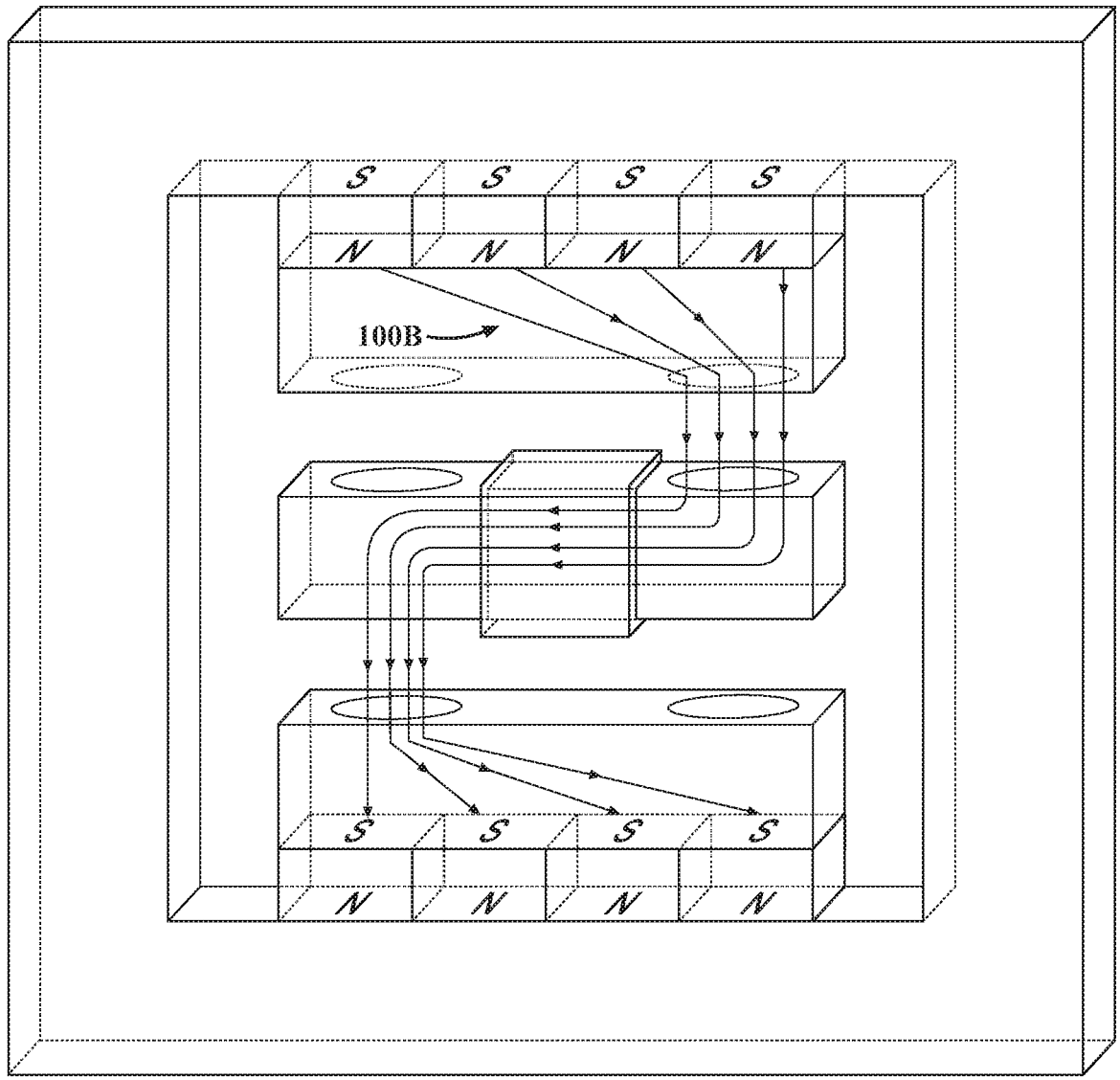
FIG. 4 shows the device of FIG. 1 with the reluctance switches sequenced to cause flux to flow in the opposite direction through the center member.

The four reluctance switches are driven by electrical circuitry including a sequence control unit 900 interconnected to the reluctance switches 401-4. Under the control of sequence control unit 900, reluctance switches 401 and 404 close simultaneously, while switches 402 and 403 open, causing the flux from stationary permanent magnets 201-204 and 211-214 to switch as shown in FIG. 3. Reluctance switches 401 and 404 then open simultaneously after which switches 402 and 403 close, causing the flux to switch as shown in FIG. 4. This 2×2 opening and closing cycle is repeated and, as it does, the magnetic flux from stationary permanent magnets 201-204 and 211-214 is alternated through central core member 102 around which is wound a conducting coil or coils, 300, in which electrical voltage is induced causing electrical current to flow and thereby producing AC electricity. Because permanent magnet groups 201-204, 211-214 are parallel with opposite poles facing, each 2×2 switching cycle changes the polarity (direction) of the flux in center member 102. All embodiments facilitate continued, self-sustaining operation after the injection of a starting pulse to the reluctance switches.

In terms of the materials used, permanent magnets 201-204, 211-214 may either be magnetic assemblies or single magnetized units. Preferred materials are ceramic ferrite magnets ($Fe_2O_3$), samarium cobalt ($SmCo_5$); or combinations of iron, neodymium, and boron.

The magnetizable members 101, 102, 103 are composed of a material with a high magnetic permeability that is constructed to minimize eddy currents where such material may be a laminated steel assembly, a ferrite core such as that used in transformers, or a nanocrystalline material, and, in conjunction with the reluctance switches, provide flux paths 100A and 100B in FIGS. 3, 4 respectively. Magnetizable member 104 is composed similarly to 101, 102, 103; it is beneficial but not essential to support flux paths 100A and 100B.

Conducting coil or coils 301 and 302 are wound around the core member 102 with as many turns as required to meet the voltage objective. Insulated copper wire, either multi-strand or single-strand, is a sufficient and typical material. The electricity induced in conducting coil 302 may be fed back into sequence control unit 900 to cause a self-sustaining cycle. In this mode of operation, starting pulses of electricity are provided from a chemical battery or another source, as required.

Reluctance switches 401, 402, 403, 404, in order to switch magnetic flux, may be implemented with different unique methodologies and configurations, as described herein.

Figure 5:
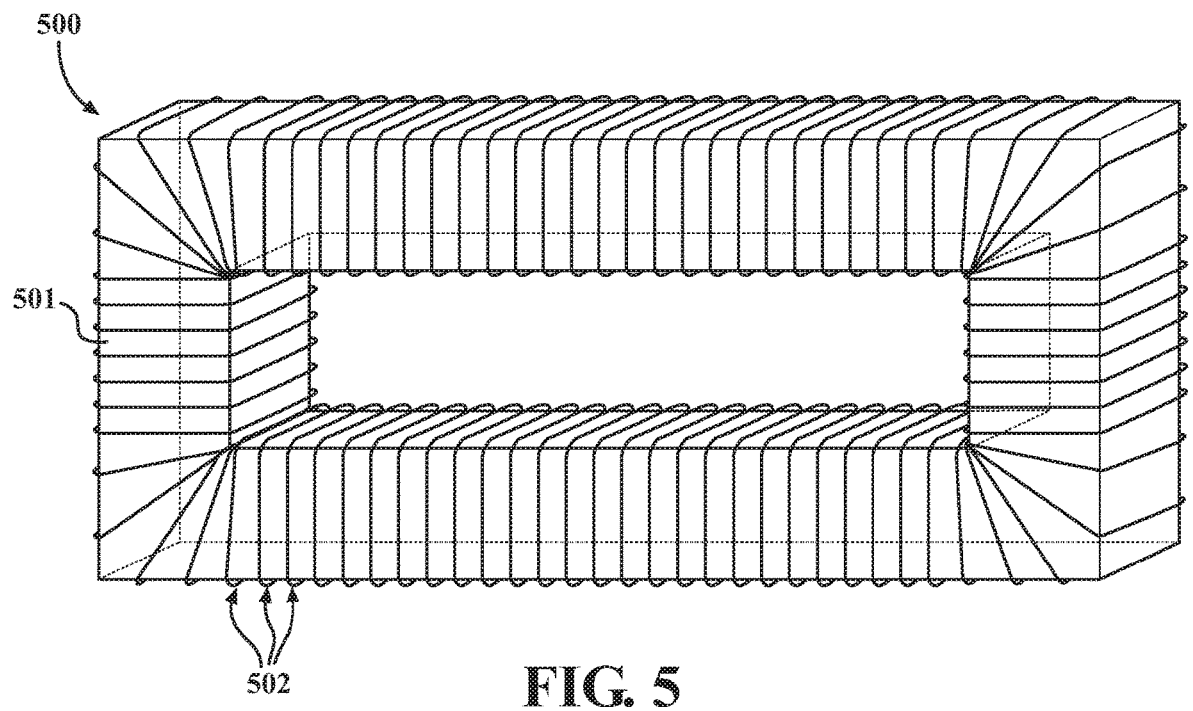
FIG. 5 shows one of the four "first unique" reluctance switches, each of which is based upon magnetic saturation of a ferrite or ferrite-like material (on-condition to off-condition) wound with either insulated steel or insulated copper wire so as to contain the induced flux within the switch as the ferrite is saturated.

A first type of reluctance switch has the topology shown in 500 of FIG. 5 in which the (initial) magnetic on-condition results from the permeability of the ferrite material in a recliner, flat-sided, quasi-toroid shape (the core) 501 wrapped with steel wire 502 which mitigates the gap-effect of copper wire, and in which the off-condition is created by the use of a circuit that causes electromagnetic induction in the core 501 bringing it to magnetic saturation with minimal flux leakage due to its "toroidal-style" windings 502.

Figure 6:
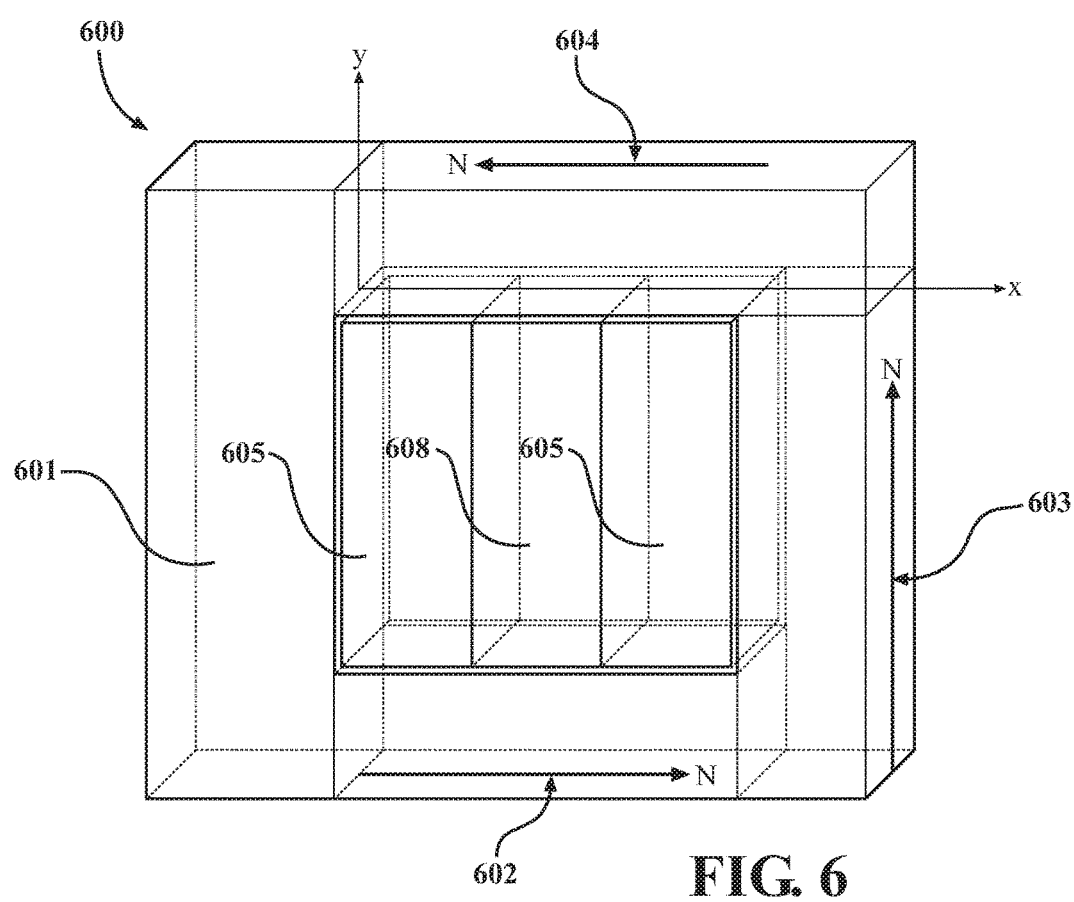
FIG. 6 shows one of the four "second unique" reluctance switches, each of which is based upon the un-saturation of a ferrite or ferrite-like material (off-condition to on-condition) the saturation of which initially resulted from adjacent permanent magnets.

A second type of reluctance switch has the topology shown in 600 of FIG. 6 in which the (initial) magnetic off-condition results from the magnetic saturation of ferrite material 601 by three-magnet assembly comprised of magnets 602, 603, 604, and in which the magnetic on-condition results from the magnetic short caused by applying current to the electromagnet comprised of coil 605 with steel center 606 which connects magnets 602 and 604.

Figure 7A:
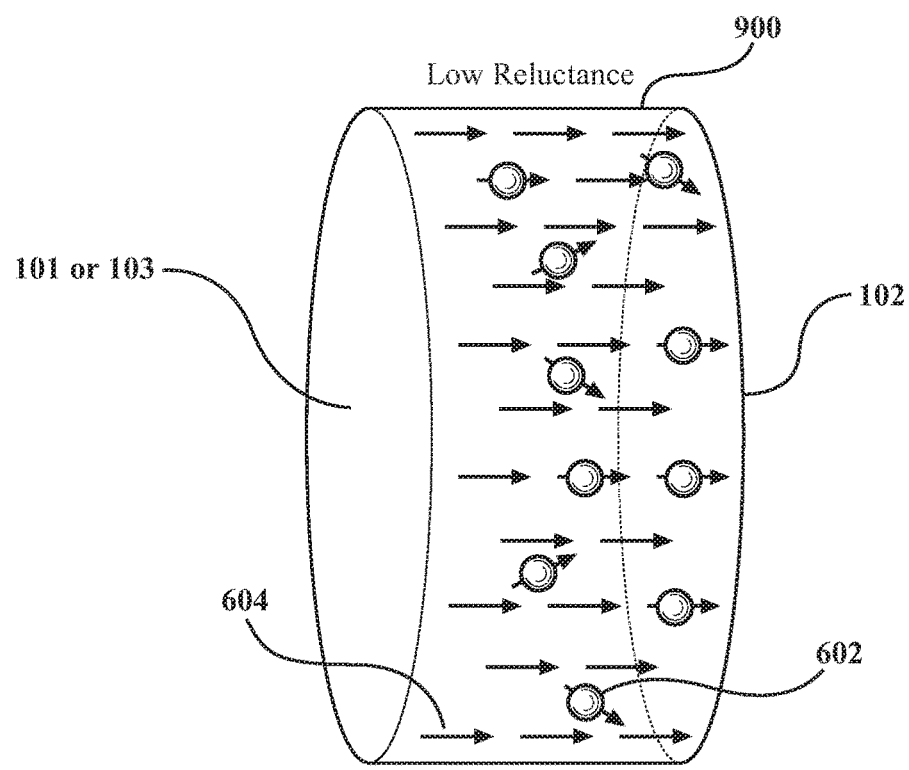
FIG. 7A shows the composition of one of the four "third unique" reluctance switches, each of which employs a material or materials that form a magnetic bridge (initial on-condition) under their normal magnetic load.
Figure 7B:
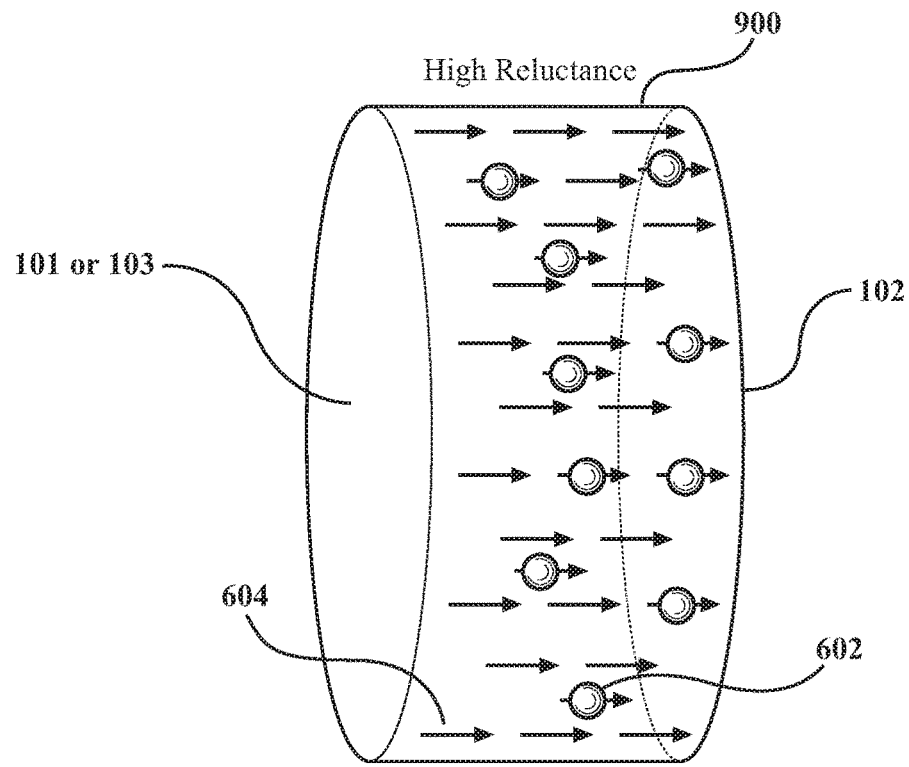
FIG. 7B shows the reluctance switch of FIG. 7A in a high reluctance state (off-condition) due to the application of heat, electrical field, or laser stimulation.

A third type of reluctance switch has configuration and methodology to disrupt the inherent on-condition of its default, low reluctance magnetic flux bridge. FIG. 7A shows such a reluctance switch, which contains a core comprised of a Ferro fluid or other material with a Curie Temperature that causes an abrupt change (typically increase) in reluctance by a means (e.g., laser or microwave stimulation) to raise the temperature of the material to its Curie Temperature in an adiabatic or near-adiabatic way. FIG. 7B shows the reluctance switch of FIG. 7A in an off-condition caused by sequence control unit 900 electrically causing the application of heat.

Figure 2:
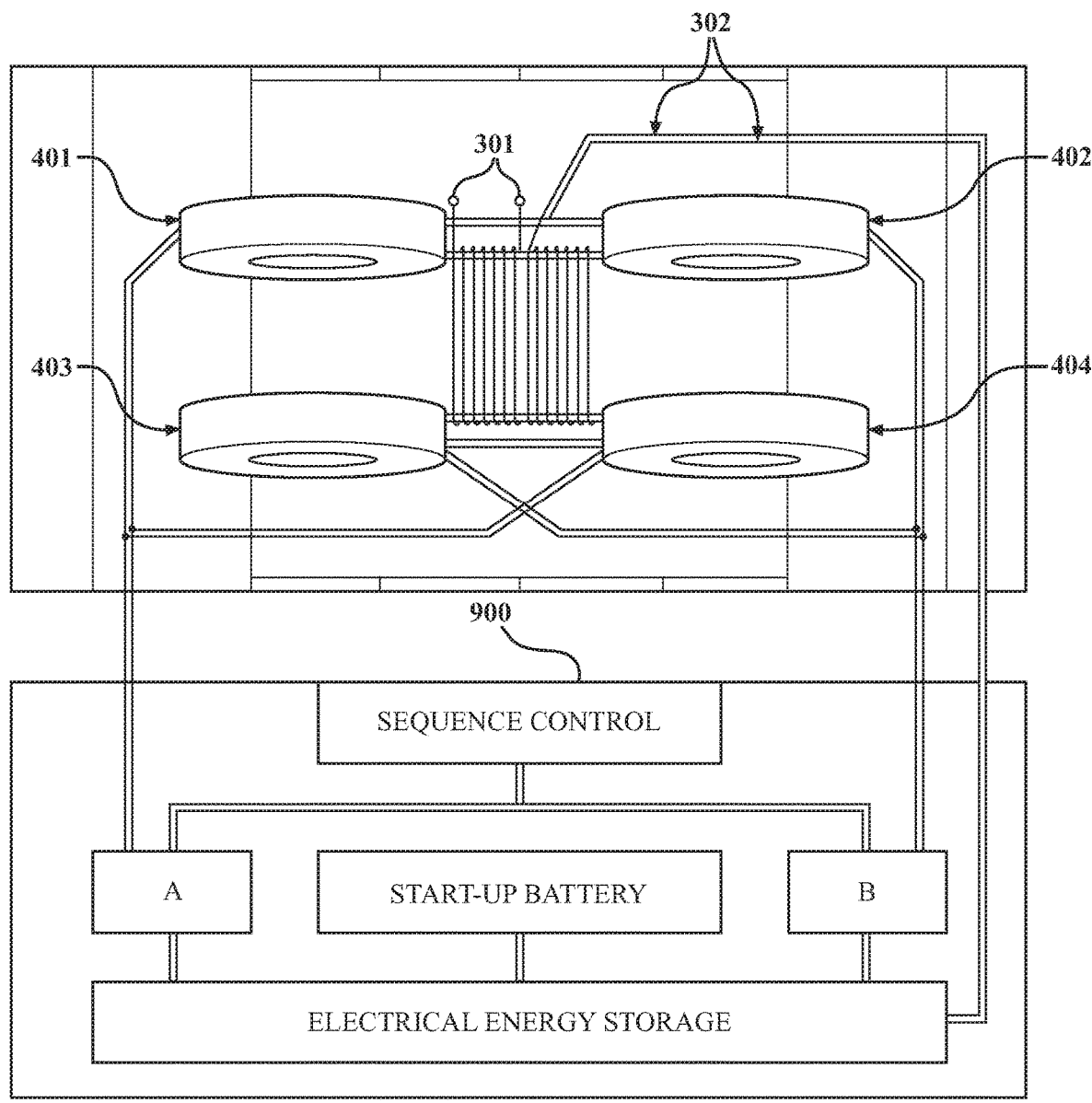
FIG. 2 shows the diagram of the sequential electrical processes of the circuit that operates the reluctance switches in FIG. 1.

FIG. 2 indicates additional functions performed by the sequence control unit when it is operating the first and second types of reluctance switches, these functions being: [a] create the magnetic on-condition or off-condition in reluctance switches 401-4 in the 2×2 sequence previously described; [b] operate in an energy efficient manner by storing "short burst" amperage that energize coils 501 (first type) or 605 (second type) in their respective sequence by simultaneously removing the voltage and short circuiting each coil in applicable sequence thereby trapping the magnetic flux in applicable coils 502 (first type) or 605 (second type) causing two of them to continue to provide the on-condition or off-condition without continued energy consumption; [c] perform the function of energy recovery from coils 501 or 605 at the conclusion of their 2×2 switching cycles; and [d] perform the insertion of the recovered electrical energy as electrical current into applicable coils 501 or 605 at the beginning of their next switching cycle.

In FIG. 2, Circuit A is operative to perform the following functions:
Connect to switch 401, 404;
Pulse with Voltage/Current from electrical energy storage;
Short coils and trap current;
Pause for remainder of half cycle;
Dump trapped current to electrical energy storage; and
Disconnect from 401, 404.
Likewise, Circuit B is operative to perform the following functions:
Connect to switch 402, 403;
Pulse with Voltage/Current from electrical energy storage;
Short coils and trap current;
Pause for remainder of half cycle;
Dump trapped current to electrical energy storage; and
Disconnect from 402, 403.

In summary, the AC electricity generator described herein converts magnetic flux energy into electrical power and includes at least two permanent magnets generating flux, a magnetic structure with three parallel magnetizable members of which each of the outer two are in contact with at least one of the permanent magnets, a center magnetizable core member around which is wound an electrically conducting pickup coil, and four magnetic flux switches (reluctance switches) each in contact with an outer magnetic member and with the center magnetic member. Operation of the reluctance switches in a 2×2 fashion sequentially reverses the flux from the magnets through the center magnetizable member thereby inducing AC electricity in the electrically conducting pickup coil(s).

The invention claimed:

1. Electrical power conversion apparatus using magnetic flux energy, comprising:
   three magnetizable members, each having first and second ends, including a first member, a central member, and a second member;
   four reluctance switches, including a first switch between the first ends of the first and central members, a second switch between the second ends of the first and central members, a third switch between the first ends of the central and second members, and a fourth switch between the second ends of the central and second members;
   a contiguous loop of magnetizable material;
   at least one permanent magnet having a first pole coupled to a first point of the loop and a second pole coupled to the first magnetizable member;
   at least one permanent magnet having a first pole coupled to the second magnetizable member and a second pole coupled to an opposing point of the loop;
   whereby the first poles of both magnets are north, and the second poles of both magnets are south poles, or vice versa;
   at least one loop of electrically conductive material wound around the central magnetizeable member between the first and second ends thereof; and
   an electrical control unit operative to drive the reluctance switches at a switching frequency such that flux from the permanent magnets reverses in the central magnetizable member, thereby inducing electrical energy in the loop of electrically conductive material.

2. The apparatus of claim 1, wherein the magnetizable members and the loop of magnetizeable material exhibit a high magnetic permeability (low reluctance).

3. The apparatus of claim 1, wherein the switching frequency is between 1 Hz and 100,000 Hz.

4. The apparatus of claim 3, wherein the switching frequency between 50 Hz and 10,000 Hz.

5. The apparatus of claim 1, wherein:
   each reluctance switch is implemented with a steel or copper coil wrapped around a ferrite or ferrite-like material shaped as a rectilinear, flat-sided, quasi-toroid; and
   each switch is controlled by applying an electric current to the coil to magnetically saturate the switch with minimal flux leakage and thereby present a high reluctance condition within that part of the magnetic path.

6. The AC electricity generator of claim 1, wherein:
   each reluctance switches is comprised of a four-sided magnetic structure formed by three magnets and a fourth initially saturated ferrite side that initially presents a low-reluctance condition; and
   the application of an electric current to an embedded electromagnet causes a magnetic short circuit resulting in the de-saturation of the ferrite side of the switch, thereby permitting magnetic flux to pass through the switch.

7. The apparatus of claim 1, wherein the reluctance switches are composed of materials that change reluctance under the influence of an electric field, heat, pressure or other externally applied stimulus.

8. The apparatus of claim 1, wherein the reluctance switches are composed of a ferrofluidic material.

9. The apparatus of claim 8, wherein the ferrofluidic material comprises magnetic beads dispersed in a liquid, such that at room temperature the ferrofluid exhibits a low magnetic reluctance and at high temperature the ferrofluid exhibits a high magnetic reluctance.

10. The apparatus of claim 8, further including switching circuitry operative to activate the switches applying heat to the ferrofluid via microwave energy or by heating a material surrounding the ferrofluid.

11. The apparatus of claim 1, wherein the reluctance switches are composed of one or more materials that change crystal structure under the influence of an electric field or pressure such that the crystalline magnetic anisotropy constant changes and the permeability increases or decreases.

12. The apparatus of claim 1, wherein reluctance switches change relative magnetic permeability from a value of between 1 and 10 to a value between 20 and one million, or vice versa, in response to the electrical control unit.

13. The apparatus of claim 12, wherein the reluctance switches change relative magnetic permeability from a value of between 1 and 3 to a value between 4 and one million, or vice versa, in response to the electrical control unit.

14. The apparatus of claim 1, wherein the permanent magnets are implemented using a plurality of permanent magnets.

15. The apparatus of claim 1, wherein the permanent magnets are ceramic ferrite magnets ($Fe_2O_3$), samarium cobalt (SmCo5), or combinations of iron neodymium, and boron.

16. The apparatus of claim 1, wherein electrical control unit is further operative to perform current trapping.

17. The apparatus of claim 1, wherein electrical control unit is further operative to perform electrical energy capture and recycling.

* * * * *